(12) United States Patent
Wallingford

(10) Patent No.: US 6,642,688 B1
(45) Date of Patent: Nov. 4, 2003

(54) THROTTLE AND AC MOTOR CONTROL THROUGHOUT SHIFTS OF MULTI-SPEED TRANSMISSIONS

(76) Inventor: Errol E. Wallingford, 1019 Lavender Lane, Sydenham ON (CA), K0H 2T0

( * ) Notice: Subject to any disclaimer, the term of this patent is extended or adjusted under 35 U.S.C. 154(b) by 1 day.

(21) Appl. No.: 10/152,071

(22) Filed: May 22, 2002

(51) Int. Cl.$^7$ ................................................ H02P 1/24

(52) U.S. Cl. ............................ 318/727; 318/11; 318/3; 318/567

(58) Field of Search ................................ 318/727, 11, 3, 318/9, 560, 567, 569; 74/857, 866

(56) References Cited

U.S. PATENT DOCUMENTS 5,031,479 A * 7/1991 Ibamoto et al. ............. 477/110

* cited by examiner

Primary Examiner—Karen Masih
(74) Attorney, Agent, or Firm—Dowell & Dowell, P.C.

(57) ABSTRACT

The problem of losing throttle control when controlling an AC motor throughout transmission shifts has been solved for a finite set of discrete waveforms. The solution requires making as many discrete speed waveform tables as there are gear ratios in the transmission. Each table has speed entries appropriate for controlling acceleration and deceleration while in its selected gear ratio. In addition when a new gear ratio is selected a transition to the new table with a changed motor rpm can be done with the throttle unchanged. This provides a smooth control for both manual and automatic transmissions.

7 Claims, 2 Drawing Sheets

THROTTLE AND AC MOTOR CONTROL THROUGHOUT SHIFTS OF MULTI-SPEED TRANSMISSIONS

FIELD OF THE INVENTION

This invention relates to a combined Throttle and Motor control system for use with an AC induction motor connected to a multi-speed transmission, either manual or automatic.

BACKGROUND TO THE INVENTION

In my earlier US patent application Serial No.09/676,775, filed Oct. 2 2000 and entitled "AC Motor Control for a Vehicle having a multi-speed Transmission 11" the problems of ac motor control throughout shifts of a multi-speed transmission were essentially solved. In essence smooth transmission shifts were made based on a constant vehicle speed throughout the shifts. Prior to up-shifting the motor was rotating at a certain selected rpm. Following the shift the motor rotated at a selected lower rpm based on a change in the overall transmission ratio. During the shifting all operative power was removed. The power to the motor was only reapplied when the new reduced motor rpm was appropriate for the degree of change in the overall transmission ratio. Conversely, downshifting caused an increase in motor rpm but was handled in a manner similar to up-shifting. The small momentum of the rotor was no match for the vehicle momentum when the clutch was engaged, hence the motor rapidly adjusted to the new rpm following re-engagement of the clutch. The gear ratio following the shift was automatically identified by dividing the smaller wheel rpm into the larger motor rpm and comparing its value with known overall speed reduction ratios. When two successive control cycle checks indicated the same valid transmission ratio, within reasonable limits, the shift was considered to be complete and power was restored.

The changes in the motor rpm was correctly accounted for throughout the shifts by reducing the motor rpm to its new changed rpm following a shift. Since the change required is quite large, especially in the lower gears, this prevented stalling on up-shifting and large regenerative currents on downshifting.

Unfortunately, however, throttle control is also affected by the gear change. Assuming a shift from $1^{st}$ gear to $2^{nd}$ gear. A typical change in motor rpm following the up-shift is 45%. Following the shift the motor will be correctly re-powered at its new rpm but the throttle remains in the same position as previously and since the throttle is used directly to control motor rpm it has essentially lost control.

OBJECT OF INVENTION

Thus, it is an object of the present invention to provide a motor control system which combines the earlier results of motor control throughout transmission shifts with a throttle control technique for maintaining constant throttle control throughout the shifts. A novel and easily implemented solution is available for systems which use a finite set of fixed speeds. Other solutions for addressing this problem have not been found.

Since the solution is limited to a finite set of discrete speeds, a Patel and Hoft harmonic reduced set of discrete speeds as described in "Generalized Techniques of Harmonic Elimination and Voltage Control in Thyristor Inverters", Part I, Harmonic Elimination, IEEE Trans. on Industrial Applications, Vol 1 A-9, No 3, May-June 1973, pp 310–317, Patel and Hoft, is recommended. The Patel and Hoft generated speeds have their five most troublesome harmonics nearly completely eliminated. This permits motor and inverter design to use only passive cooling instead of the liquid cooling of most current implementations. When generating the discrete speeds a minimal separation between the speed members is desirable for use with a multi-speed transmission.

An electronic controller for setting the speed of an AC motor, when limited to a set of discrete speeds, is programmed to include a table of ascending speeds starting with zero rpm up to a selected maximum desired rpm. The controller then measures the motor's rotor speed. The discrete rpm immediately higher than this speed in the table is selected as the current motor rpm. The one immediately higher than that in the table is selected as an acceleration rpm. The one of lower speed than the current rpm is selected as a deceleration rpm. A linear throttle control may be used to access any members of the speed table. For any throttle position which maps into a position in the speed table equal or higher than the acceleration rpm an acceleration is called for. If the throttle is also used to control deceleration then any throttle position which maps equal or below the deceleration rpm in the table may be used for throttle control of deceleration. Optionally, for deceleration, the vehicle's brake lamp signal may be used to activate the motor at the current deceleration rpm from the table.

The spacing between the discrete speeds in the speed table provides a means for controlling acceleration. Large spacings typically increase acceleration but result in larger motor slips, rougher control and lower efficiency. A compromise amongst the various options may, therefore, be desirable.

BRIEF SUMMARY OF INVENTION

This invention is suited for use in an electric vehicle or any other system that uses a DC power source and a digitally controlled inverter to drive an AC induction motor. The digital control system provides a discrete series of motor speeds by reference to pre-established sets of instructions for generating waveforms, there being instructions for generating waveforms at a number of discrete frequencies.

Thus, by one aspect of this invention there is provided a throttle control system for use throughout gear shifts in an AC motor and multi-speed transmission system, comprising:
a) removing power from said motor prior to a gear shift;
b) selecting an acceptable after-shift motor speed at a selected pre-shift throttle position, from a set of master tables of harmonically reduced computer generated motor speeds for each gear ratio in said multi speed transmission;
c) adjusting motor speed to said acceptable after—shift motor speed; and
d) reapplying power to said motor.

DETAILED DESCRIPTION OF PREFERRED EMBODIMENTS

According to the present invention an operator input system is provided in the form of a speed indicator (pedal or throttle) that is adjusted by the operator to select a desired speed for the vehicle. Current usage is limited almost entirely to a single large gear reduction ratio of typical value about 12:1. For highway speeds very high motor rpm is required where motor efficiency is poor. The classical solution is to use a transmission.

The problem with using a transmission with an AC induction motor is that while vehicle speed is constant throughout transmission shifts motor rpm and throttle or accelerator pedal positioning change. It is possible to correct both the throttle and motor rpms using mathematics based on the gear changes. But with gear changes the spacing between rpms also changes. Mathematics alone tends to mask the changes required and is unattractive as the calculations and speed selection needlessly increase control cycle times limiting vehicle acceleration. A better solution is to use predetermined choices from sets of tables. Instead of using a single speed as set forth in Table 1, which shows a discrete set of available motor speeds and pointers used to access these speeds, use multiple speed sets as in Table 2, one for each speed of the multi speed transmission. Table 1 is a listing of 64 precalculated waveforms corresponding to 64 discrete motor speeds, selected to have minimal separation between elements and to cover the motor speeds required.

Figure 1:
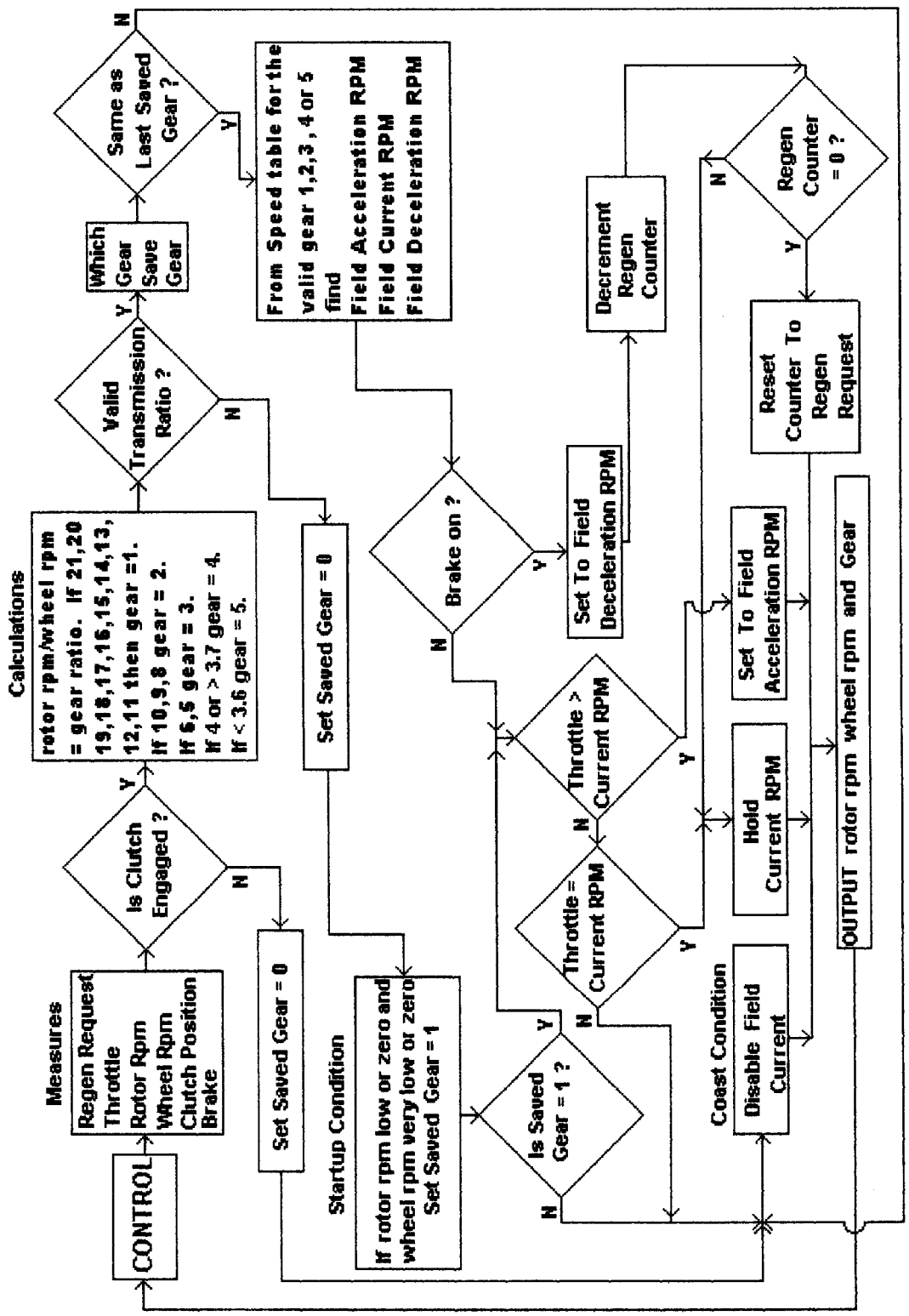
FIG. 1 is a schematic diagram of a complete control system for a manual transmission. Between shifts operation is as for a fixed gear reduction vehicle.

Table 2 shows how 5 speed tables each with 30 manually selected members one for each gear ratio can be selected from the speeds in FIG. 1 to solve for changes in throttle and motor speed throughout transmission shifts.

TABLE 1

DISCRETE SET OF AVAILABLE SPEEDS WITH POINTERS

| MOTOR RPM | POINTER HEX |
|---|---|
| 0 | $fa42 |
| 617 | $f9fa |
| 629 | $f9f1 |
| 641 | $f9e8 |
| 654 | $f9df |
| 667 | $f9d6 |
| 680 | $f9cd |
| 694 | $f9c4 |
| 709 | $f9bb |
| 725 | $f9b2 |
| 741 | $f9a9 |
| 758 | $f9a0 |
| 775 | $f997 |
| 794 | $f98e |
| 813 | $f985 |
| 833 | $f97c |
| 855 | $f973 |
| 877 | $f96a |
| 901 | $f961 |
| 926 | $f958 |
| 952 | $f94f |
| 980 | $f946 |
| 1010 | $f93d |
| 1041 | $f934 |
| 1075 | $f92b |
| 1111 | $f922 |
| 1149 | $f919 |
| 1190 | $f910 |
| 1234 | $f907 |
| 1282 | $f8fe |
| 1333 | $f8f5 |
| 1388 | $f8ec |
| 1429 | $f8e3 |
| 1515 | $f8da |
| 1587 | $f8d1 |
| 1667 | $f8c8 |
| 1754 | $f8bf |
| 1852 | $f8b6 |
| 1961 | $f8ad |

TABLE 1-continued

DISCRETE SET OF AVAILABLE SPEEDS WITH POINTERS

| MOTOR RPM | POINTER HEX |
|---|---|
| 2083 | $f8a4 |
| 2057 | $f822 |
| 2110 | $f823 |
| 2165 | $f824 |
| 2222 | $f825 |
| 2283 | $f826 |
| 2347 | $f827 |
| 2415 | $f828 |
| 2488 | $f829 |
| 2564 | $f82a |
| 2646 | $f82b |
| 2732 | $f82c |
| 2825 | $f82d |
| 2924 | $f82e |
| 3030 | $f82f |
| 3145 | $f830 |
| 3268 | $f831 |
| 3401 | $f832 |
| 3546 | $f833 |
| 3704 | $f834 |
| 3875 | $f835 |
| 4065 | $f836 |
| 4272 | $f837 |
| 4505 | $f838 |

TABLE 2

FIVE SPEED TABLE SETS ONE FOR EACH GEAR

| First 15:1 | Second 8.3:1 | Third 5.62:1 | Fourth 3.99:1 | Fifth 3.33:1 | Veh Spd KPH | Step Percent |
|---|---|---|---|---|---|---|
| 0 | 0 | 0 | 0 | 0 | 0 | |
| 617 | 0 | 0 | 0 | 0 | 4.5 | |
| 741 | 0 | 0 | 0 | 0 | 5.5 | 22 |
| 926 | 0 | 0 | 0 | 0 | 6.7 | 23 |
| 1111 | 0 | 0 | 0 | 0 | 8.1 | 20 |
| 1333 | 0 | 0 | 0 | 0 | 9.7 | 20 |
| 1515 | 833 | 0 | 0 | 0 | 10.9 | 14 |
| 1754 | 952 | 617 | 0 | 0 | 12.7 | 16 |
| 2083 | 1149 | 758 | 0 | 0 | 15.1 | 19 |
| 2415 | 1333 | 901 | 617 | 0 | 17.5 | 16 |
| 2825<– | 1587 | 1075 | 758 | 617 | 20.5 | 17 |
| 3145 | 1754 | 1149 | 833 | 680 | 22.9 | 11 |
| 3546–> | 1961 | 1333 | 980 | 833 | 25.8 | 13 |
| 4065 | 2222<– | 1515 | 1075 | 901 | 29.2 | 15 |
| 4505 | 2488 | 1667 | 1149 | 980 | 32.7 | 12 |
| 0 | 2825 | 1961 | 1429 | 1149 | 37.1 | 14 |
| 0 | 3145 | 2110<–– | 1515 | 1234 | 41.3 | 11 |
| 0 | 3546–> | 2347 | 1667 | 1388 | 46.6 | 11 |
| 0 | 3875 | 2646 | 1852<–– | 1587 | 51.3 | 13 |
| 0 | 4065 | 2825 | 1961 | 1667 | 54.8 | 6 |
| 0 | 4505 | 3145 | 2222 | 1852 | 61.0 | 11 |
| 0 | 0 | 3546––> | 2564 | 2110 | 70.8 | 13 |
| 0 | 0 | 4065 | 2825 | 2347 | 77.1 | 10 |
| 0 | 0 | 4505 | 3145 | 2646 | 85.9 | 11 |
| 0 | 0 | 0 | 3546–> | 2924 | 96.8 | 13 |
| 0 | 0 | 0 | 3875 | 3268 | 107 | 9 |
| 0 | 0 | 0 | 4272 | 3546 | 116 | 9 |
| 0 | 0 | 0 | 4505 | 3875 | 127 | 9 |
| 0 | 0 | 0 | 0 | 4272 | 139 | 10 |
| 0 | 0 | 0 | 0 | 4505 | 147 | 5 |

Figure 2:
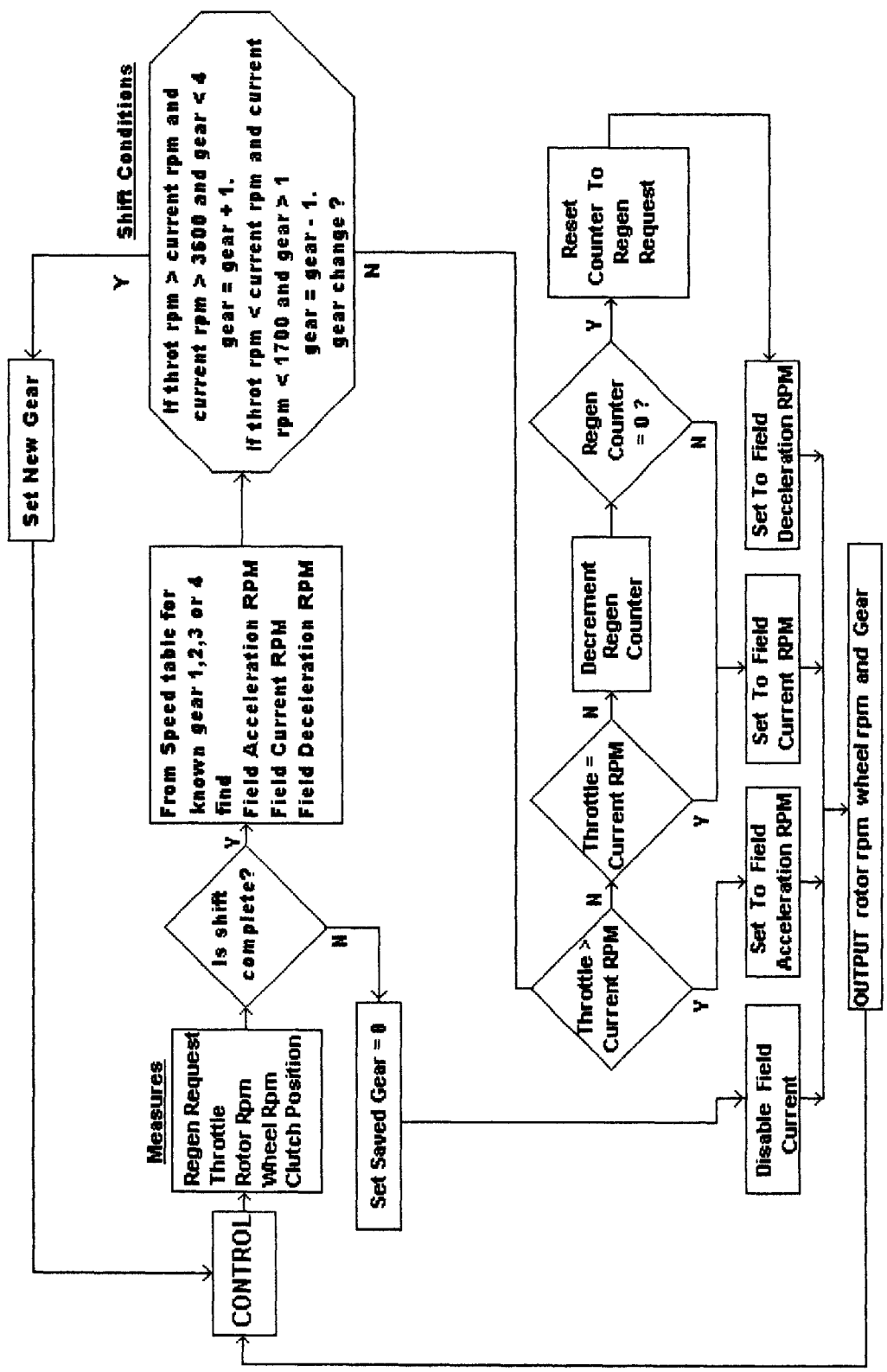
FIG. 2 is a schematic diagram of an automatic transmission control system similar to that for the manual system except that lower and upper bounds for shifting are preselected to keep vehicle operation in the sweet zone.

The correct mathematical calculation for the new motor speed following a gear change is predetermined to the closest matching value from the discrete set of Table 1 and is based on the new gear ratio. The changed motor speed is at the same throttle position as before the shift. The motor is disabled during shifts and only re-powered to its new speed once the shift has been verified to be complete. Four sets of tables are shown in FIG. 2 one for each of the four transmission ratios used. All gear shifts are indicated by horizontal transmissions shifts between the tables. All same gear speed changes are vertical shifts within the same table. The solution chosen for Table 2 purposely uses large spacing at the lower rpms to provide good vehicle acceleration but diminishes these for smooth vehicle performance in the normal driving ranges.

Note that vehicle speed and throttle position remain unchanged by transmission gear shifts and are indicated by essentially horizontal movement between the tables. Actually gear shifts occur when accelerating or decelerating. When accelerating and gear shifting to a higher gear the motor speed in the new table selected will be reduced as required and the throttle will automatically select the acceleration rpm just above it in the new table. When decelerating and gear shifting to a lower gear the motor speed in the new table selected will be higher as required and the throttle (if used to control deceleration) will automatically select the deceleration rpm in the new table. If the brake signal is used to control deceleration (also called regenerative braking) then the regeneration will be correct even if a gear shift occurs while braking. The regeneration will be interrupted throughout the gear shift but will resume as soon as the clutch is re-engaged in the new gear position. The preferred selections for automatic and manual up-shifts and down-shifts to keep the motor rpm within its sweet zone is indicated by the horizontal arrows.

At the first indication of a shift the power to the motor is reduced to zero. This could be from depressing the clutch pedal or from an invalid transmission ratio. When two successive control cycles show the same valid transmission value then and only then is the shift considered to be complete and the new transmission ratio to be positively identified. If other means are available for indicating the exact gear used this may also be used but the motor power should never be reenabled until the shift is known to be complete. The motor is now turning at a changed rpm depending on whether it is an up-shift or a down-shift but selection of the proper rpm to re-power the motor is provided from the new look up table appropriate for the new gear with the same throttle position as previously. Further throttle change requests will produce movement vertically within the chosen gear table until a new shift is made.

A minimal depression of the brake pedal, just sufficient to activate the brake lights, may be used to control deceleration. As soon as the brake on signal is activated the motor is immediately powered at its deceleration rpm. This is immediately followed by a time delay whose magnitude is based on the user selected regeneration request. A minimal delay of about 15 milliseconds appears to be most appropriate, but much higher values should be used initially, as the braking effect is dependent in part on system control cycle timing for multiple successive regenerative retards. Full pressure on the brake will activate both the regenerative retard and friction braking.

It is important that the selection of the correct speed table to use following a gear shift be made only after a full shift completion. If the time required for the shift is not known then the criteria used for a manual transmission should be used. That is two successive control cycles of the known valid overall transmission ratio. The same speed tables are used for the automatic transmission as for the manual transmission.

In Table 1 a complete speed table set of 44 waveforms for producing 44 different motor speeds can be selected by a master processor at will by simply calling the appropriate pointer for the speed desired. The waveform speeds were purposely generated with minimal spacing between speeds to provide a closer matching of speeds throughout shifts. The vehicle speed is set by the control CPU from a throttle request which sets the motor rpm. Prior to a shift of gears the throttle controls the motor in one of the four gears according to the speed table for that gear ratio. Speed changes move vertically up or down that table. These are seen in Table 2. Following a gear change the new gear ratio table using the same throttle setting as prior to the shift, which is a horizontal movement through the table selects a motor speed which is activated on the completion of the shift and which will provide both a constant vehicle speed and a constant throttle throughout the shift. The entries in Table 2 were generated by first selecting speeds with a reasonable separation for gear 4 starting at the high rpms. Next the required rpm for the other four ratios based on the change in the ratios. If above 4505 rpm, a zero was set in the table. The nearest rpm from the discrete set of Table 1 was then chosen. When an rpm below 617 is needed for gear 4 a zero was entered. The process was repeated for the remaining gears 4 then 3 then 2 and 1 inserting 0's where appropriate. Larger spacings for the lower rpms were selected where acceleration is more important than efficiency. With manual transmissions protection is required to protect from unwise shifts of the transmission. For instance downshifting increases motor speed.

Downshifts from too high a position from $4^{th}$ gear can lead to very high motor rpms. To protect the motor the power to the motor is disabled as can be seen by the zeros above the maximum rpm in the lowest three gear tables. When accelerating in any gear and a throttle targets a motor rpm above the highest in the current table which is 4505 rpm then a motor rpm of 4505 will be selected.

In the lower gears the user should have up-shifted before reaching this value, however the zeros in the higher gears in the low rpm range prevent the driver trying to accelerate at very low rpms. At low rpms the speed of 617 in $1^{st}$ gear could be easily mapped into appropriate speeds in the higher gear ratios. But this would be very undesirable as the combination of low speed and poor torque would make acceleration difficult. The placing of zeros in the tables prevents a driver from making these bad choices.

In practice it has been found that regenerative retard using the brake light signal for activation provides a smoother vehicle control than easing up on the throttle for regenerative retard. Both systems work using the correct selection of motor speed and throttle positioning throughout transmission shifts according to the present invention. Other methods to control regenerative braking will suggest themselves to those skilled in the art, such as a linear braking pedal signal.

What is claimed is:

1. A throttle control system for use throughout gear shifts in an AC motor and multi-speed transmission system, comprising:
   a) removing power from said motor prior to a gear shift;
   b) selecting an acceptable after-shift motor speed, at a selected pre-shift throttle position, from a set of master tables of motor speeds for each gear ratio in said multi speed transmission;
   c) adjusting motor speed to said acceptable after-shift motor speed; and
   d) reapplying power to said motor.

2. A throttle control system as claimed in claim 1 including the step of verifying a gear shift is complete before reapplying power to said motor.

3. A throttle control system as claimed in claim 1 wherein deceleration control of said motor power is effected by a brake light on signal.

4. A throttle control system as claimed in claim 1 wherein said transmission system is a manual transmission.

5. A throttle control system as claimed in claim 1 wherein said transmission system is an automatic transmission.

6. A throttle control system as claimed in claim 1 wherein said master tables contain harmonically reduced motor speeds.

7. A throttle control system as claimed in claim 6 wherein said tables are computer generated.

* * * * *